(12) United States Patent
Kuroda

(10) Patent No.: US 11,167,616 B2
(45) Date of Patent: Nov. 9, 2021

(54) STABILIZER LINK AND METHOD FOR MANUFACTURING STABILIZER LINK

(71) Applicant: NHK SPRING CO., LTD., Kanagawa (JP)

(72) Inventor: Shigeru Kuroda, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 312 days.

(21) Appl. No.: 16/327,820

(22) PCT Filed: Aug. 23, 2017

(86) PCT No.: PCT/JP2017/030139
§ 371 (c)(1),
(2) Date: Feb. 23, 2019

(87) PCT Pub. No.: WO2018/038163
PCT Pub. Date: Mar. 1, 2018

(65) Prior Publication Data
US 2019/0217679 A1     Jul. 18, 2019

(30) Foreign Application Priority Data
Aug. 25, 2016  (JP) .............................. JP2016-164647

(51) Int. Cl.
*B60G 21/055*       (2006.01)
*F16C 11/06*        (2006.01)
(Continued)

(52) U.S. Cl.
CPC ......... *B60G 21/0551* (2013.01); *B21D 53/10* (2013.01); *B60G 7/005* (2013.01);
(Continued)

(58) Field of Classification Search
CPC .. B60G 21/0551; B60G 21/055; B60G 7/005; B60G 2206/8102
See application file for complete search history.

(56) References Cited

U.S. PATENT DOCUMENTS 1,817,529 A * 8/1931 Skillman ................. B25B 27/28
29/898.047
3,833,309 A    9/1974 Hobbs
(Continued)

FOREIGN PATENT DOCUMENTS

CN        103381769 A      11/2013
DE   10 2004 061 057 A1    7/2006
(Continued)

OTHER PUBLICATIONS

International Search Report and Written Opinion of the International Search Report for PCT/JP2017/030139 dated Nov. 21, 2017.
(Continued)

*Primary Examiner* — Nicole T Verley
(74) *Attorney, Agent, or Firm* — Kenealy Vaidya LLP

(57) ABSTRACT

This stabilizer link includes a metal support bar, and ball joints that are provided at both ends of the support bar. Each ball joint includes a ball stud one end of which is fastened to a suspension device or a stabilizer, and which has a ball part at the other end thereof, and a housing that rotatably supports the ball part of the ball stud. The support bar includes: a body part extending in a nearly linear shape, and reinforcement parts each having a nearly annular shape and each provided at both ends of the body part. The reinforcement parts of the support bar are each embedded in the housing so as to surround the ball part.

4 Claims, 7 Drawing Sheets

(51) Int. Cl.
  *B21D 53/10* (2006.01)
  *B60G 7/00* (2006.01)
(52) U.S. Cl.
  CPC ............ *B60G 21/055* (2013.01); *F16C 11/06* (2013.01); *B60G 2204/1224* (2013.01); *B60G 2204/416* (2013.01); *B60G 2206/7104* (2013.01); *B60G 2206/724* (2013.01); *B60G 2206/81* (2013.01); *B60G 2206/83* (2013.01)

(56) References Cited

U.S. PATENT DOCUMENTS

| | | | | |
|---|---|---|---|---|
| 5,165,306 | A * | 11/1992 | Hellon | B60G 7/005 74/588 |
| 5,427,467 | A * | 6/1995 | Sugiura | F16C 11/0638 403/133 |
| 5,549,321 | A * | 8/1996 | Novak | B60G 21/0551 267/190 |
| 5,662,348 | A * | 9/1997 | Kusama | B60G 7/001 280/124.134 |
| 6,698,963 | B1 | 3/2004 | Parker et al. | |
| 8,267,415 | B2 * | 9/2012 | Jeong | F16C 7/02 280/124.133 |
| 8,657,314 | B2 * | 2/2014 | Mosteiro Goyoaga | F16C 11/0685 280/124.107 |
| 8,863,616 | B2 * | 10/2014 | Ciavatta | F16C 3/22 74/594.1 |
| 8,870,202 | B2 * | 10/2014 | Teijeiro Castro | B60G 21/0551 280/124.106 |
| 8,905,417 | B2 * | 12/2014 | Kuroda | F16C 11/0638 280/124.152 |
| 10,220,666 | B2 * | 3/2019 | Kuroda | F16C 7/026 |
| 10,836,228 | B2 * | 11/2020 | Kuroda | F16C 11/0685 |
| 10,919,359 | B2 * | 2/2021 | Rapp | B60G 21/0551 |
| 2007/0069496 | A1 * | 3/2007 | Rinehart | B21D 53/88 280/124.166 |
| 2016/0347145 | A1 * | 12/2016 | Keeler | B60G 21/0551 |
| 2017/0313154 | A1 * | 11/2017 | Kuroda | F16C 11/0657 |
| 2018/0154732 | A1 * | 6/2018 | Mosteiro Goyoaga | B23K 9/007 |
| 2018/0298940 | A1 | 10/2018 | Kuroda | |

FOREIGN PATENT DOCUMENTS

| | | | | |
|---|---|---|---|---|
| DE | 202007001892 U1 | 7/2008 | | |
| DE | 102017010952 A1 * | 5/2018 | | B60G 7/001 |
| FR | 2 815 387 A1 | 4/2002 | | |
| FR | 2941405 A1 * | 7/2010 | | B60G 21/0551 |
| FR | 3012079 A1 * | 4/2015 | | F16C 11/0695 |
| JP | S61-176011 U | 11/1986 | | |
| JP | H04-20810 U | 2/1992 | | |
| JP | 2000-108632 A | 4/2000 | | |
| JP | 2016-084057 A | 5/2016 | | |
| JP | 2017-067260 A | 4/2017 | | |
| WO | 2018/038163 A1 | 3/2018 | | |
| WO | WO-2018181035 A1 * | 10/2018 | | F16C 11/0633 |

OTHER PUBLICATIONS

Japanese Office Action for the related Japanese Patent Application No. 2016-164647 dated May 23, 2017.
Japanese Office Action for the related Japanese Patent Application No. 2016-164647 dated Dec. 5, 2017.
The extended European Search Report for the related European Patent Application No. 17843641.6 dated Mar. 24, 2020.
Japanese Notification for the related Japanese Patent Application No. 2017-142092 dated Oct. 7, 2020.
Chinese Office Action for the related Chinese Patent Application No. 201780051015.2 dated Aug. 3, 2021.

* cited by examiner

STABILIZER LINK AND METHOD FOR MANUFACTURING STABILIZER LINK

CROSS-REFERENCE TO RELATED APPLICATIONS

This application is a U.S. National Stage Application under 35 U.S.C § 371 of International Patent Application No. PCT/JP2017/030139 filed 23 Aug. 2017, which claims the benefit of priority to Japanese Patent Application No. 2016-164647 filed 25 Aug. 2016, the disclosures of all of which are hereby incorporated by reference in their entireties.

TECHNICAL FIELD

The present invention relates to a stabilizer link for coupling a suspension device and a stabilizer provided in a vehicle to each other, and to a method for manufacturing the stabilizer link.

BACKGROUND ART

A vehicle is provided with a suspension device that absorbs and reduces impact and vibration transmitted from a road surface via wheels to a vehicle body, and a stabilizer for enhancing roll rigidity of the vehicle body. A rod-like member called a stabilizer link is used in the vehicle in order to couple the suspension device and the stabilizer to each other. The stabilizer link is provided with a support bar and ball joints provided at both ends of the support bar, for example, as disclosed in Patent Literature 1.

The stabilizer link disclosed in Patent Literature 1 is composed of ball studs each of which has a ball part, and housings each of which is provided at both ends of the support bar and rotatably houses the ball part of the ball stud. Inside the housing, a ball seat made of resin is provided to be interposed between an inner wall of the housing and the ball part of the ball stud. An outer peripheral surface of the ball part housed in the housing slides on while being in contact with an inner peripheral surface of the ball seat, thereby allowing the ball stud to be supported to freely tilt. Thus, the ball joints provided in the stabilizer link allow the suspension device and the stabilizer to be smoothly coupled to each other.

CITATION LIST

Patent Literature

Patent Literature 1: Japanese Unexamined Patent Application Publication No. 2016-84057

SUMMARY OF INVENTION

Technical Problem

In the stabilizer link disclosed in Patent Literature 1, the support bar is constituted using a hollow pipe made of metal such as steel. At both ends of the hollow pipe constituting the support bar, a sealing part plastically deformed into a plate shape by press working is provided to prevent water or the like from entering the hollow pipe. Both end parts of the support bar are insert-molded in the housing made of resin.

However, in the stabilizer link disclosed in Patent Literature 1, each of the both end parts of the support bar does not extend so as to surround the periphery of the ball part. Accordingly, the support bar cannot reinforce the periphery of the ball part. In short, in the stabilizer link disclosed in Patent Literature 1, the housing made of resin mainly supports tensile breaking strength of the periphery of the ball part. Consequently, the housing becomes greater in its external size for the purpose of enhancement of rigidity in section thereof. As a result, there has been room for improvement left in the stabilizer link disclosed in Patent Literature 1, with respect to a reduction in the size of the stabilizer link.

The present invention has been made in view of the above actual circumstances, and an object thereof is to provide a stabilizer link, and a method for manufacturing the stabilizer link, that are capable of realizing both securing of tensile breaking strength of the periphery of a ball part and a reduction in an external size thereof.

Solution to Problem

To solve the above problems, a stabilizer link according to a first aspect (1) of the present invention is a stabilizer link provided in a vehicle provided with a suspension device and a stabilizer, and adapted to couple the suspension device and the stabilizer to each other, the stabilizer link including: a support bar made of metal; and ball joints each provided at both ends of the support bar, wherein the ball joints each include: a ball stud one end of which is fastened to a structural member, and which has a ball part at the other end thereof; and a housing made of resin that rotatably supports the ball part of the ball stud, and the support bar includes: a body part extending in a nearly linear shape; and reinforcement parts each having a nearly annular shape and each provided at both ends of the body part, and wherein the reinforcement parts of the support bar are each embedded in the housing so as to surround the ball part.

The stabilizer link according to the first aspect (1) of the present invention allows each reinforcement part having a nearly annular shape and provided at both ends of the support bar to be embedded in the housing made of resin so as to surround the ball part, thus making it possible for the reinforcement part to serve as a core metal of the housing to reinforce the periphery of the ball part.

The stabilizer link according to the first aspect (1) of the present invention makes it possible to obtain a stabilizer link capable of realizing both securing of tensile breaking strength of the periphery of the ball part and a reduction in the external size thereof.

Moreover, a stabilizer link according to a second aspect (2) of the present invention is the stabilizer link according to the first aspect (1), wherein the body part of the support bar has a nearly U-shaped cross section continuously.

The stabilizer link according to the second aspect (2) of the present invention allows the body part of the support bar to have a nearly U-shaped cross section continuously, thus making it possible to secure the strength of the body part in the support bar.

Moreover, a stabilizer link according to a third aspect (3) of the present invention is the stabilizer link according to the second aspect (2), wherein a nearly U-shaped and curved outer wall part in the body part is provided to follow a circular arc of a circumscribed circle of the body part.

The stabilizer link according to the third aspect (3) of the present invention allows the nearly U-shaped and curved outer wall part in the body part to be provided to follow a circular arc of a circumscribed circle of the body part, thus making it possible, even if movement rotating around an axis of the body part is caused in the support bar, to prevent mutual interference between the body part and members existing around the support bar.

Moreover, a stabilizer link according to a fourth aspect (4) of the present invention is the stabilizer link according to the first aspect (1), wherein the reinforcement parts of the support bar each have a nearly L-shaped cross section continuously.

The stabilizer link according to the fourth aspect (4) of the present invention allows each reinforcement part of the support bar to have a nearly L-shaped cross section continuously, thus making it possible to secure the strength of each reinforcement part in the support bar.

Moreover, a method for manufacturing a stabilizer link according to a fifth aspect (5) of the present invention is a method for manufacturing a stabilizer link according to any one of the first to fourth aspects (1) to (4), the method including forming the support bar, the forming the support bar including: a step of carrying out press-forming to a workpiece having a greater size by a folding margin than an external size of the support bar, to form a part that is to form the body part and the reinforcement parts; and after the step, a step of carrying out punching by which holes are punched in parts that are to form the reinforcement parts, the holes each having an inner diameter that allows passage of the ball part of the ball stud.

In the method for manufacturing a stabilizer link according to the fifth aspect (5) of the present invention, the support bar is formed by carrying out press-forming to a workpiece having a greater size by a folding margin than an external size of the support bar, to form a part that is to form the body part and the reinforcement parts, and then carrying out punching by which holes are punched in parts that are to form the reinforcement parts, the holes each having an inner diameter that allows passage of the ball part of the ball stud.

The method for manufacturing a stabilizer link according to the fifth aspect (5) of the present invention allows the support bar to be formed by carrying out the press-forming and the punching, thus making it possible to obtain a stabilizer link capable of realizing both securing of tensile breaking strength of the periphery of the ball part and a reduction in the external size thereof, through a relatively simple process.

Advantageous Effects of Invention

The present invention makes it possible to provide a stabilizer link capable of realizing both securing of tensile breaking strength of the periphery of the ball part and a reduction in the external size thereof.

DESCRIPTION OF EMBODIMENTS

Hereinafter, a stabilizer link according to one or more embodiments of the present invention will be described in detail with reference to the drawings when appropriate.

Figure 1:
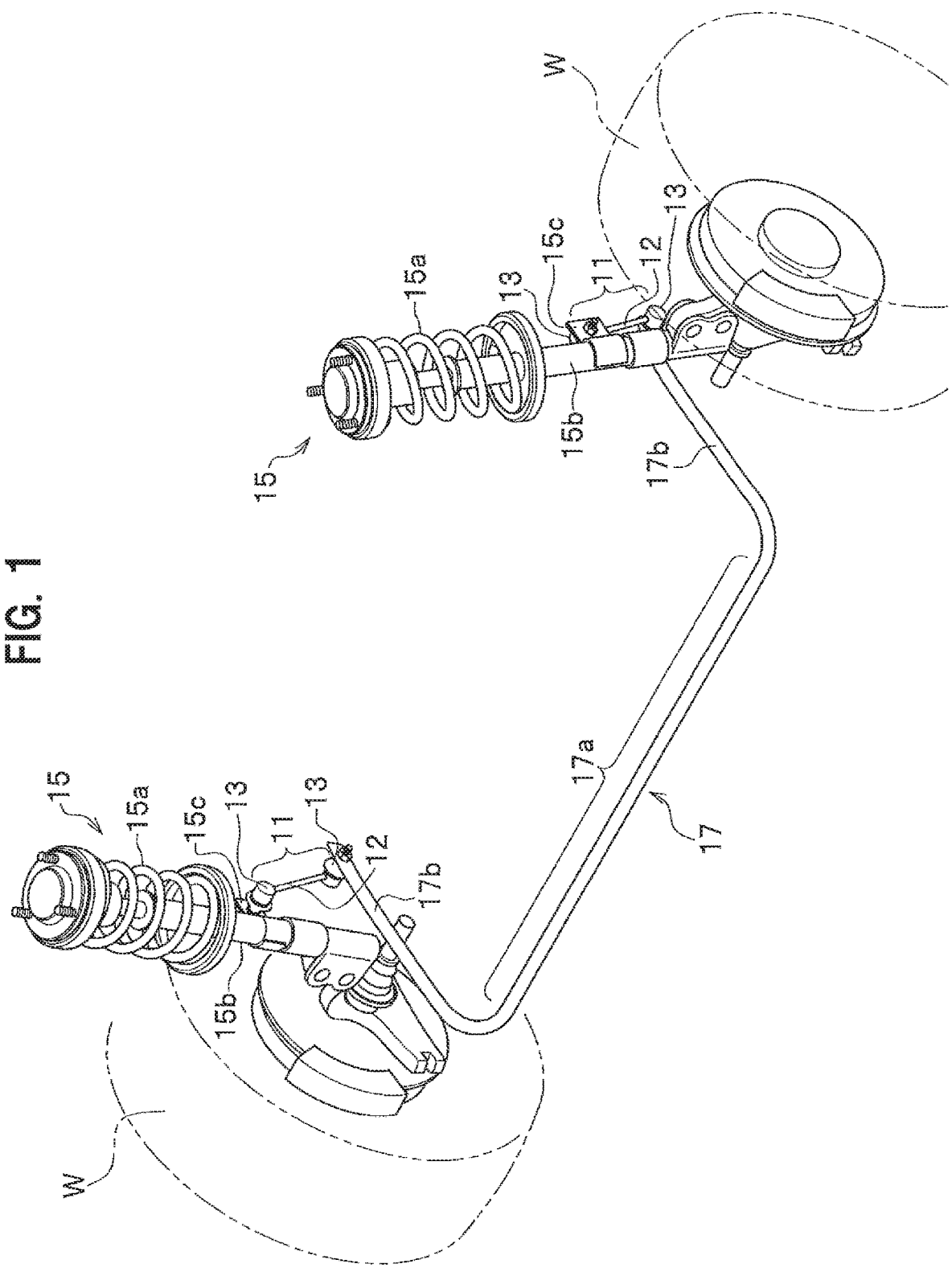
FIG. 1 is a perspective view showing a mounting state of a stabilizer link according to an embodiment of the present invention on a vehicle.
Figure 2:
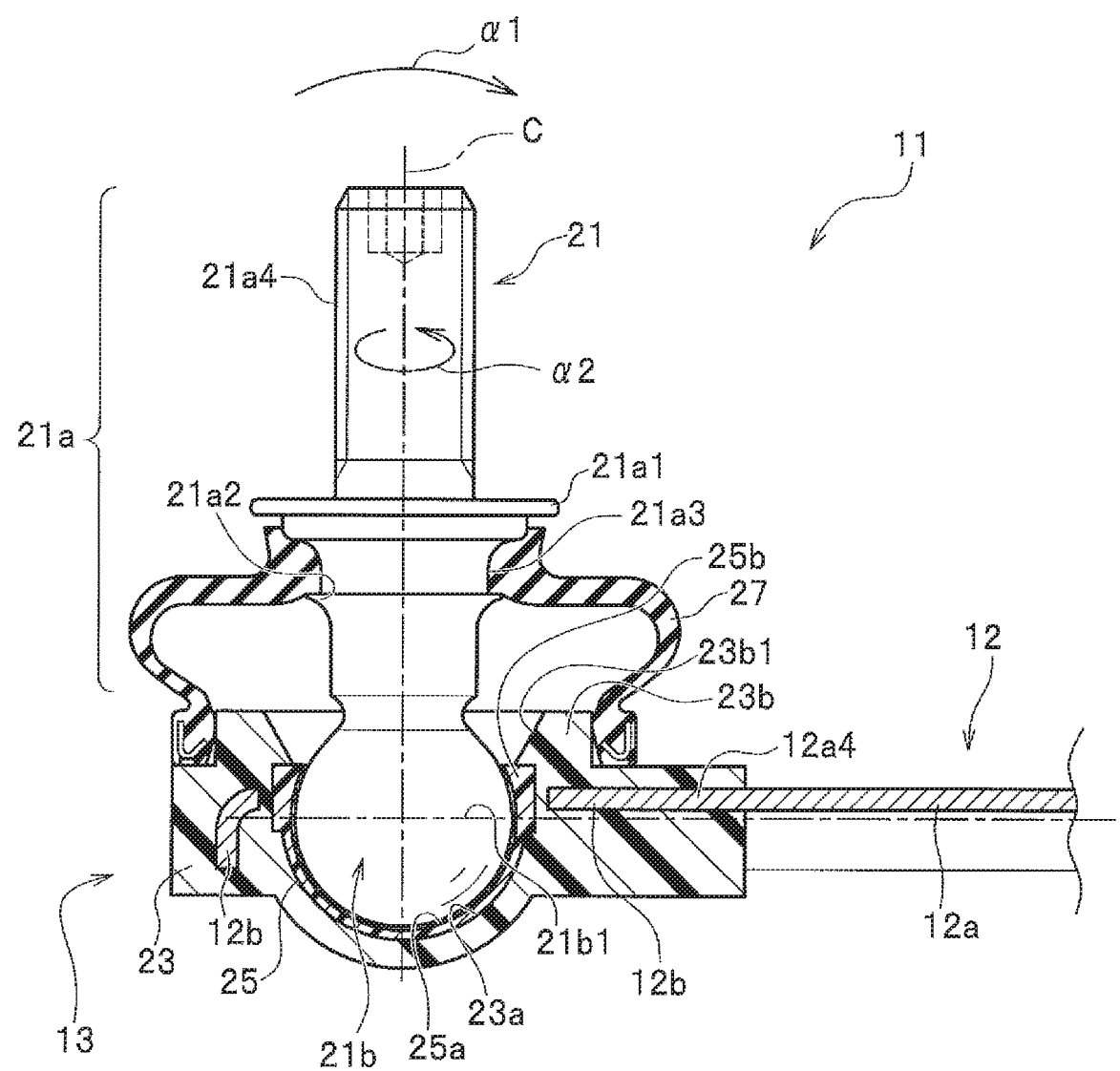
FIG. 2 is a vertical cross-sectional view of the periphery of a ball joint included in the stabilizer link according to the embodiment of the present invention.
Figure 3:
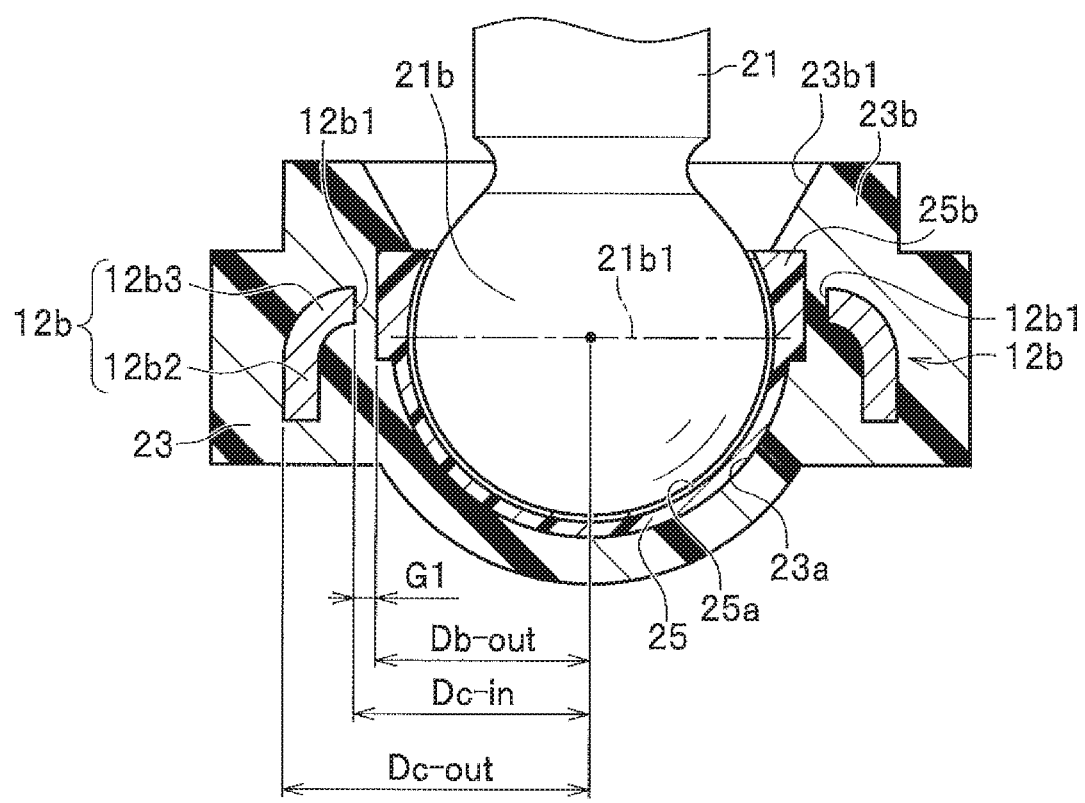
FIG. 3 is an enlarged view showing a state in which a ball seat is mounted on a ball part of a ball stud, together with cross sections of a housing, the ball seat, and a support bar.

Configuration of a Stabilizer Link 11 According to an Embodiment of the Present Invention Configuration of the stabilizer link 11 according to the embodiment of the present invention will be described, by way of example, taking the case in which the stabilizer link 11 is mounted on a vehicle (not shown). FIG. 1 is a perspective view showing a mounting state of the stabilizer link 11 according to the embodiment of the present invention on the vehicle. FIG. 2 is a vertical cross-sectional view of the periphery of a ball joint 13 included in the stabilizer link 11 according to the embodiment of the present invention. FIG. 3 is an enlarged view showing a state in which a ball seat 25 is mounted on a ball part 21b of a ball stud 21, together with cross sections of a housing 23, the ball seat 25, and a support bar 12.

As shown in FIG. 1, each wheel W is fitted to a vehicle body (not shown) of the vehicle through a suspension device 15. Each suspension device 15 includes a coil spring 15a and a shock absorber 15 in order to absorb and reduce impact and vibration transmitted from a road surface via the wheels W to the vehicle body.

As shown in FIG. 1, the right and left suspension devices 15 are coupled to each other through a stabilizer 17 having a nearly channel shape and made of a spring steel rod. For the purpose of enhancing roll rigidity (resistance to torsional deformation) of the vehicle body to suppress rolling of the vehicle, the stabilizer 17 includes a torsion bar 17a extending between the right and left wheels W, and a pair of arm parts 17b extending from both ends of the torsion bar 17a in a direction perpendicular to the torsion bar 17a. The suspension device 15 and the stabilizer 17 each correspond to the "structural member" set forth in the claims.

The shock absorber 15b supporting the wheel W and the stabilizer 17 are coupled to each other through the stabilizer link 11. The manner of connection is the same for the right and left wheels W. As shown in FIG. 1, the stabilizer link 11 is configured with the ball joints 13 provided at both ends of the support bar 12 made of metal such as steel and having a nearly linear shape.

As shown in FIG. 2, the support bar 12 is provided with a body part 12a extending in a nearly linear shape, and a pair of reinforcement parts 12b, 12b each having a nearly annular shape and each provided at both ends of the body part 12a. Configuration of the support bar 12 will be described in detail later.

The stabilizer link 11 according to the embodiment of the present invention is manufactured by an insert injection molding process in which the support bar 12 and the ball stud 21 are inserted in given positions inside a metal mold (not shown) having a predetermined shape, and with the state being kept, resin that is to form the housing 23 is injected into the metal mold. Note that the term "insert injection molding process" used in the description below means the process described above.

Of the pair of ball joints 13, the ball joint 13 of one side is fastened and fixed to the tip of the arm part 17b of the stabilizer 17, and the ball joint 13 of the other side is fastened and fixed to a bracket 15c of the shock absorber 15b. Note that the pair of ball joints 13 has the same configuration.

As shown in FIG. 2, the ball joint 13 is composed of the ball stud 21 made of metal such as steel, the housing 23 made of resin, and the like. The ball stud 21 is configured to have a stud part 21a at one end thereof and to have a spherical ball part 21b at the other end thereof. The stud part 21a and the ball part 21b are joined together by welding. The stud part 21a and the ball part 21b may be formed integrally with each other. The housing 23 is provided at both ends of the support bar 12 and configured to rotatably support the ball part 21b of the ball stud 21.

The stud part 21a of the ball stud 21 has a great flange part 21a1 and a small flange part 21a2 formed to be mutually separated. Between the great flange part 21a1 and the small flange part 21a2, an encircling recessed part 21a3 is formed. Moreover, a male screw part 21a4 is provided on the tip side from the great flange part 21a1 of the stud part 21a (on the opposite side of the ball part 21b of the ball stud 21).

Between an upper end of the housing 23 and the encircling recessed part 21a3 of the stud part 21a, an encircling dust cover 27 composed of an elastic body such as rubber is fitted so as to cover a gap between them. The dust cover 27 has a function of preventing rainwater, dust or the like from entering into the ball joint 13.

As shown in FIG. 2 and FIG. 3, the housing 23 has a semispherical recessed part 23a of a semispherical shape formed on an inner bottom part thereof, in order to rotatably support the ball part 21b of the ball stud 21. The housing 23 has an annular projecting flange 23b formed on an upper part thereof. The projecting flange 23b has a tapered part 23b1 of a reverse circular truncated cone shape. An angle of inclination of the tapered part 23b1 relative to a stud shaft line C (see FIG. 2) is set to an appropriate value depending on a swing angle and a shaft diameter of the ball stud 21.

As a resin material for the housing 23, considering that it has thermal plasticity (because it is formed by injection molding) and satisfies requirements for a predetermined strength, for example, PA66-GF30 (which mixes PA66 with glass fibers having a weight ratio of 30 to 50% and has a melting point of approximately 270 degrees Celsius) is preferably used. Note that examples of the resin material for appropriate use in the housing 23 include, other than PA66-GF30, engineering plastics and super engineering plastics such as PEEK (polyetheretherketone), PA66 (polyamide 66), PPS (polyphenylenesulfide) and POM (polyoxymethylene), FRP (fiber reinforced plastics), GRP (glass reinforced plastics) and CFRP (carbon fiber reinforced plastics).

As shown in FIG. 2 and FIG. 3, the ball seat 25 made of resin is provided to be interposed between the ball part 21b of the ball stud 21 and the semispherical recessed part 23a of the housing 23. The ball seat 25 is composed of a housing part 25a of a semispherical shape that covers, with a resin layer having a nearly uniform thickness, a lower half part of the ball part 21b the center of which is on the stud shaft line C (see FIG. 2), and an encircling belt-shaped part 25b that covers, in the shape of an encircling belt, a trunk part including an equator part 21b1 of the ball part 21b. The encircling belt-shaped part 25b is formed to have a greater thickness than a thickness of the housing part 25a.

Note that the equator part 21b1 of the ball part 21b means a part at which an encircling length in the horizontal direction of the ball part 21b around the stud shaft line C (see FIG. 2) as the central axis of rotation becomes the maximum. The ball seat 25 is provided to smooth movement of the ball part 21b of the ball stud 21 relative to the semispherical recessed part 23a of the housing 23. The ball seat 25 is manufactured by an independent injection molding process.

Thus, the ball seat 25 having the housing part 25a for the ball part 21b includes the encircling belt-shaped part 25b that covers the equator part 21b1 of the ball part 21b, thus making it possible to allow sliding movement of the ball part 21b to be smoothly performed and to reinforce the periphery of the equator part 21b1 of the ball part 21b.

In the ball joint 13 configured as described above, when the ball stud 21 is moved relatively to the housing 23, a spherical outer peripheral surface of the ball part 21b housed in the semispherical recessed part 23a of the housing 23 slides on while being in contact with an inner peripheral surface of the ball seat 25. Thus, the ball stud 21 is supported to freely swing (see an arrow α1 in FIG. 2) and turn (see an arrow α2 in FIG. 2) relatively to the housing 23.

The suspension device 15 and the stabilizer 17 are smoothly coupled to each other through the ball joint 13 provided in the stabilizer link 11. Note that a resin material for the ball seat 25 is appropriately selected according to a resin material for the housing 23 described above.

Support Bar 12

Figure 4A:
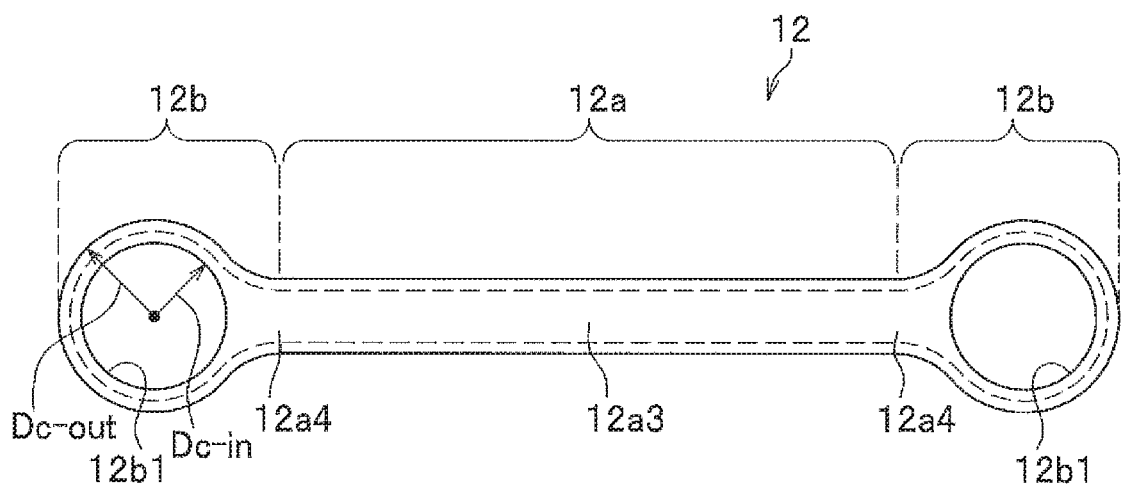
FIG. 4A is a plan view of the support bar when viewed from above.
Figure 4B:
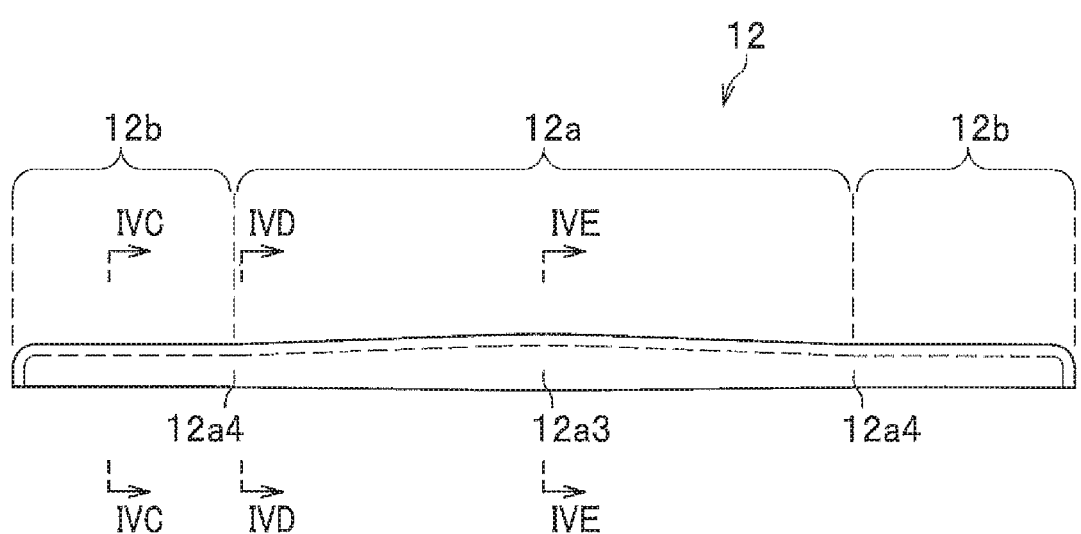
FIG. 4B is a side view of the support bar when viewed from lateral side.
Figure 4C:
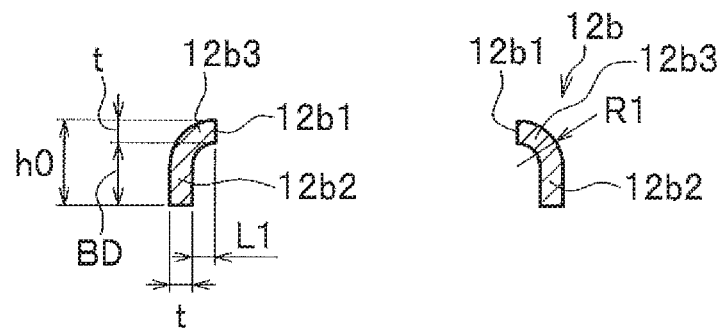
FIG. 4C is an end view taken in the direction of an arrow along the line IVC-IVC in the support bar shown in FIG. 4B.
Figure 4D:
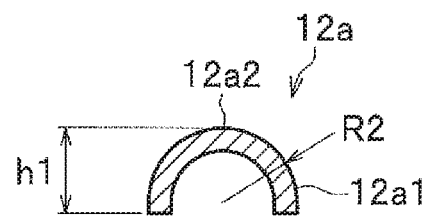
FIG. 4D is an end view taken in the direction of an arrow along the line IVD-IVD in the support bar shown in FIG. 4B.
Figure 4E:
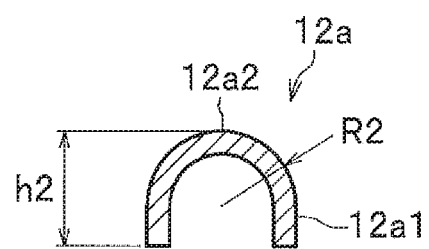
FIG. 4E is an end view taken in the direction of an arrow along the line IVE-IVE in the support bar shown in FIG. 4B.

Next, detailed structure of the support bar 12 will be described with reference to FIGS. 4A to 4E. FIG. 4A is a plan view of the support bar 12 when viewed from above. FIG. 4B is a side view of the support bar 12 when viewed from lateral side. FIG. 4C is an end view taken in the direction of an arrow along the line IVC-IVC in the support bar 12 shown in FIG. 4B. FIG. 4D is an end view taken in the direction of an arrow along the line IVD-IVD in the support bar 12 shown in FIG. 4B. FIG. 4E is an end view taken in the direction of an arrow along the line IVE-IVE in the support bar 12 shown in FIG. 4B.

As shown in FIG. 4A and FIG. 4B, the support bar 12 is composed of the body part 12a extending in a nearly linear shape, and the pair of reinforcement parts 12b, 12b each having a nearly annular shape and each provided at both ends of the body part 12a. The pair of reinforcement parts 12b, 12b has the same configuration. In view of this, in the description below, the pair of reinforcement parts 12b, 12b are generically referred to as "reinforcement part 12b".

As shown in FIG. 3 and FIG. 4A, the reinforcement part 12b of the support bar 12 includes a hole 12b1 having an inner semi-diameter size Dc-in that allows passage of the ball part 21b. As shown in FIG. 3 and FIG. 4C, the reinforcement part 12b of the support bar 12 includes a base part 12b2 having a longitudinal section that extends in a direction of the stud shaft line C (see FIG. 2), and a folded part 12b3 having a longitudinal section that extends in a direction orthogonal to the direction of the stud shaft line C and inwardly toward the encircling belt-shaped part 25b of the ball seat 25. The reinforcement part 12b of the support bar 12 has a nearly L-shaped cross section, which is composed of the base part 12b2 and the folded part 12b3, continuously in a nearly annular manner. The reinforcement part 12b of the support bar 12 is embedded in the housing 23 so as to surround the periphery of the encircling belt-shaped part 25b of the ball seat 25. A nearly L-shaped corner part is formed to have a circular arc of a common radius R1 (the radius R1>the thickness t: see FIG. 4C).

Thus, in the reinforcement part 12b provided with the base part 12b2 and the folded part 12b3 in the support bar 12, the folded part 12b3 extends inwardly toward the encircling belt-shaped part 25b and the reinforcement part 12b is embedded in the housing 23 so as to surround the periphery of the encircling belt-shaped part 25b, thus making it possible to allow the sliding movement of the ball part 21b to be smoothly performed and to realize both securing of tensile breaking strength of the periphery of the ball part 21b and a reduction in an external size thereof.

The inner semi-diameter size Dc-in of the reinforcement part 12b is set to be greater by a gap G1 (preferably, G1=>1 mm) than the maximum outer semi-diameter size Db-out (see FIG. 3) of the ball seat 25. Thus, the gap G1 is formed between the reinforcement part 12b of the support bar 12 and the ball seat 25, thereby keeping mobility of the resin that is to form the housing 23 in the insert injection molding process, in a good state.

Moreover, an outer semi-diameter size Dc-out (see FIG. 3 and FIG. 4A) of the reinforcement part 12b is set to be greater than the inner semi-diameter size Dc-in by the thickness t plus a nearly L-shaped overhang length L1 (preferably, L1=>1 mm: see FIG. 4C). Thus, the nearly L-shaped overhang length L1 is secured, thereby achieving enhancement of the strength produced by the nearly L-shaped cross section of the reinforcement part 12b.

As shown in FIG. 2 and FIG. 3, the reinforcement part 12b is embedded in the housing 23 so as to surround (the equator part 21b1 of) the ball part 21b of the ball stud 21. This causes the reinforcement part 12b to serve as a core metal of the housing 23 to reinforce the periphery of the ball part 21b. As a result, the reinforcement part 12b greatly contributes to enhancement of the tensile breaking strength of the periphery of the ball part 21b. Note that, as shown in FIG. 2, the housing 23 made of resin is coated on the region of the support bar 12 in which at least an axial end part 12a4 of the body part 12a is located in addition to the reinforcement part 12b.

On the other hand, as shown in FIG. 4D and FIG. 4E, the body part 12a of the support bar 12 has a nearly U-shaped cross section 12a1 continuously in a nearly linear manner. Note that a nearly U-shaped outer wall part 12a2 is formed to have a circular arc of a common radius R2 (the radius R2=>the radius R1). Of the body part 12a of the support bar 12, a height dimension h2 (see FIG. 4E) of an axial central part 12a3 is set to be greater than a height dimension h1 (see FIG. 4D) of the axial end part 12a4. The axial end part 12a4 of the body part 12a of the support bar 12 is a boundary portion between the body part 12a and the reinforcement part 12b of the support bar 12.

Moreover, a height dimension of the body part 12a of the support bar 12 is set to be increased gradually and gently from the axial end part 12a4 toward the axial central part 12a3. This causes, when an external force is applied to the support bar 12, the stress on the body part 12a to act uniformly on the region from the axial central part 12a3 to the axial end part 12a4. Furthermore, the height dimension h1 of the axial end part 12a4 is set to be smaller than the height dimension h2 of the axial central part 12a3, thus contributing to a reduction in weight of the support bar 12.

Note that a height dimension h0 (see FIG. 4C) of the reinforcement part 12b of the support bar 12 is the same as the height dimension h1 (see FIG. 4D) of the axial end part 12a4 of the body part 12a of the support bar 12. The height dimension h0 of the reinforcement part 12b is set to a length exceeding twice the thickness t. This improves bending and drawing workability when forming the reinforcement part 12b of the support bar 12 by press working, and contributes to enhancement of rigidity of the reinforcement part 12b.

Although an axial dimension of the body part 12a of the support bar 12 is not particularly limited, for example, it is appropriately set to be about 100 to 300 mm.

Manufacturing Process of the Support Bar 12

Figure 5A:
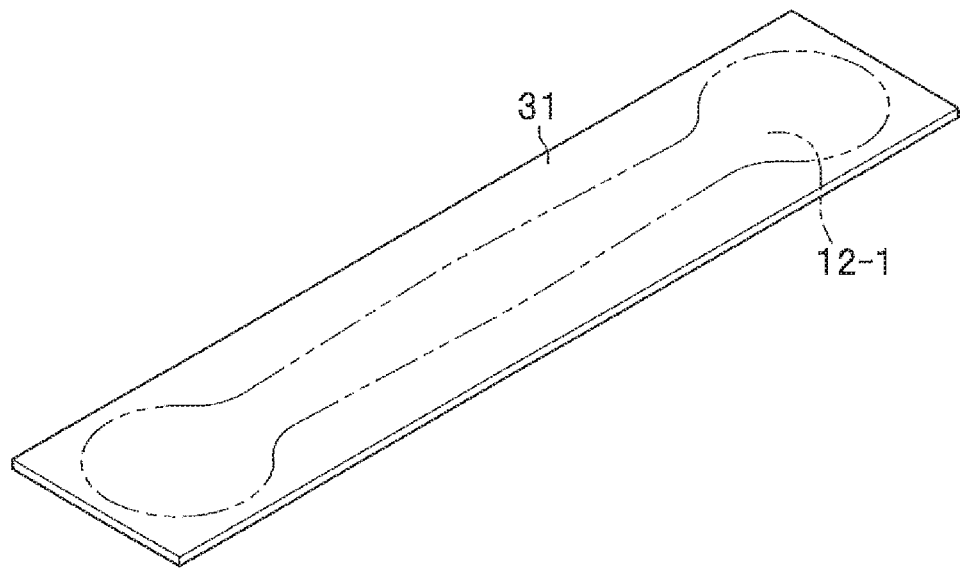
FIG. 5A is a perspective view showing, in a manufacturing process of the support bar, a step of cutting a first-stage work in progress of the support bar out of a workpiece.
Figure 5B:
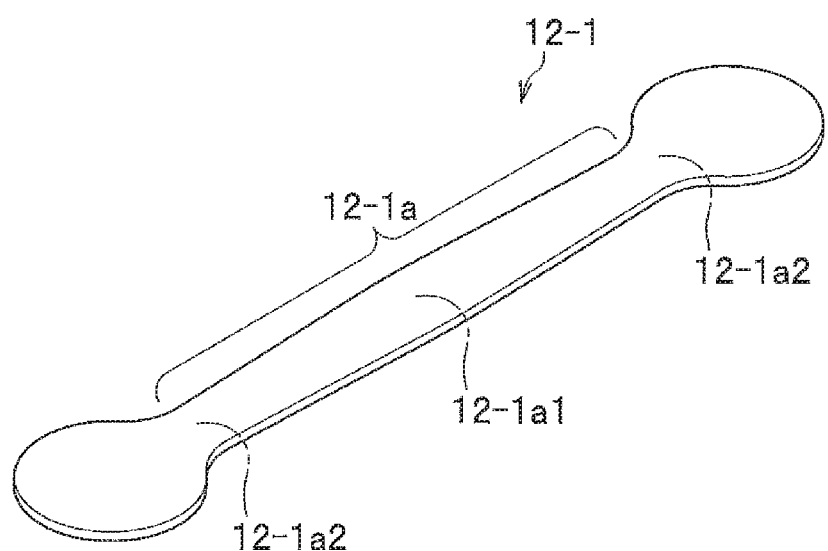
FIG. 5B is a perspective view showing the first-stage work in progress of the support bar, which is cut out of the workpiece.
Figure 5C:
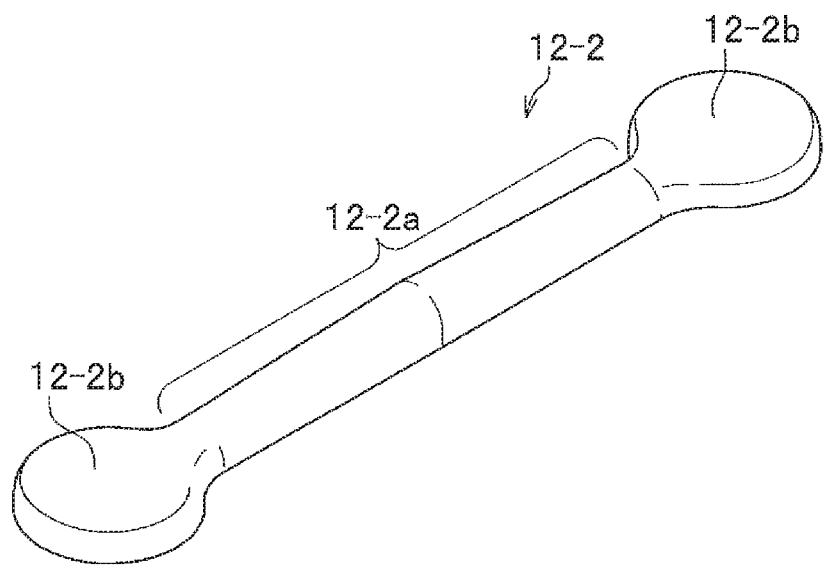
FIG. 5C is a perspective view showing a second-stage work in progress obtained by carrying out pressing to the first-stage work in progress of the support bar.
Figure 5D:
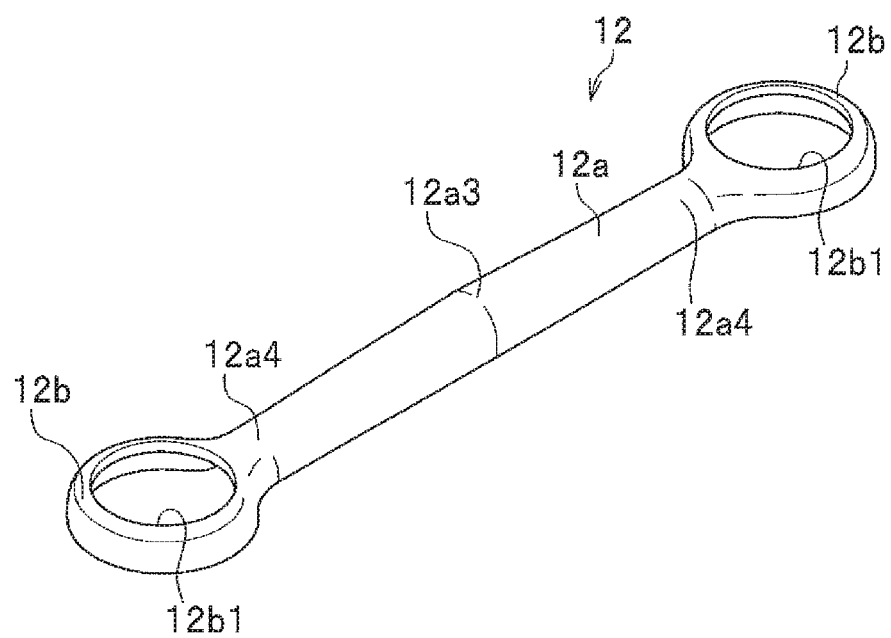
FIG. 5D is a perspective view showing an end product obtained by carrying out punching to the second-stage work in progress of the support bar.

Next, a manufacturing process of the support bar 12 will be described with reference to FIGS. 5A to 5D. FIG. 5A is a perspective view showing, in the manufacturing process of the support bar 12, a step of cutting a first-stage work 12-1 in progress of the support bar 12 out of a workpiece 31. FIG. 5B is a perspective view showing the first-stage work 12-1 in progress of the support bar 12, which is cut out of the workpiece 31. FIG. 5C is a perspective view showing a second-stage work 12-2 in progress obtained by carrying out pressing to the first-stage work 12-1 in progress of the support bar 12. FIG. 5D is a perspective view showing an end product, i.e., the support bar 12, obtained by carrying out punching to the second-stage work 12-2 in progress of the support bar 12.

First, as shown in FIG. 5A, a rectangular plate made of steel for the workpiece 31 of the support bar 12 is prepared. Although the thickness t of the workpiece 31 is not particularly limited, for example, it is set to be about 1 to 3 mm. Note that an external dimension of the workpiece 31 is set to be greater than an external size in plan of the support bar 12 as an end product, by at least a folding margin BD (BD=the height dimension h0 of the reinforcement part 12b minus the thickness t: see FIG. 4C).

Next, for example, punch-pressing using a punch (not shown) and dies (not shown) is carried out to the workpiece 31 of the support bar 12, thereby cutting out the first-stage work 12-1 in progress of the support bar 12 as shown in FIG. 5B. Note that in the first-stage work 12-1 in progress of the support bar 12, a part 12-1a that is to form the body part 12a is composed of a central part 12-1a1 and end parts 12-1a2, and the central part 12-1a1 is formed to have a greater width dimension than a width dimension of each end part 12-1a2.

Next, pressing is carried out to the first-stage work 12-1 in progress of the support bar 12, thereby obtaining the second-stage work 12-2 in progress of the support bar 12 as shown in FIG. 5C. Note that the pressing to the first-stage work 12-1 in progress of the support bar 12 is carried out, for example, as follows. That is, in the second-stage work 12-2 in progress of the support bar 12, a part 12-2a that is to form the body part 12a is formed by pressing the part 12-2a with the part 12-2a being put between an upper die (not shown) and a lower die (not shown) each having a nearly columnar side wall part. Moreover, a part 12-2b that is to form the reinforcement part 12b is formed by pressing the part 12-2b with the part 12-2b being put between an upper die (not shown) and a lower die (not shown) each having a nearly dish-shaped wall part (note that the nearly L-shaped corner part is formed to have the common radius R1).

Next, punch-pressing (hole punching) is carried out to the second-stage work 12-2 in progress of the support bar 12, thereby obtaining the support bar 12 as an end product as shown in FIG. 5D. Note that in the second-stage work 12-2 in progress of the support bar 12, the hole 12b1 is formed by carrying out punch-pressing (hole punching) using a punch (not shown) and dies (not shown) to a predetermined position on the part 12-2b that is to form the reinforcement part 12b.

Operation and Effects Produced by the Stabilizer Link 11 According to the Embodiment of the Present Invention The operation and effects produced by the stabilizer link 11 according to the embodiment of the present invention will be described below.

The stabilizer link 11 according to a first aspect (1) of the present invention includes the support bar 12 made of metal, and the ball joints 13 each provided at both ends of the support bar 12. Each ball joint 13 includes the ball stud 21 one end of which is fastened to the suspension device 15 or the stabilizer 17 (the structural member), and which has the ball part 21b at the other end thereof, and the housing 23 that rotatably supports the ball part 21b of the ball stud 21. The support bar 12 includes the body part 12a extending in a nearly linear shape, and the reinforcement parts 12b each having a nearly annular shape and each provided at both ends of the body part 12a. The reinforcement parts 12b of the support bar 12 are each embedded in the housing 23 so as to surround the ball part 21b.

The stabilizer link 11 according to the first aspect (1) of the present invention allows each reinforcement part 12b having a nearly annular shape and provided at both ends of the support bar 12 to be embedded in the housing 23 made of resin so as to surround the ball part 21b, thus making it possible for the reinforcement part 12b to serve as a core metal of the housing 23 to reinforce the periphery of the ball part 21b.

The stabilizer link 11 according to the first aspect (1) of the present invention makes it possible to obtain a stabilizer link capable of realizing both securing of tensile breaking strength of the periphery of the ball part 21b and a reduction in the external size thereof.

Moreover, the stabilizer link 11 according to a second aspect (2) of the present invention is the stabilizer link 11 according to the first aspect (1), wherein the body part 12a of the support bar 12 has a nearly U-shaped cross section continuously.

The stabilizer link 11 according to the second aspect (2) of the present invention allows the body part 12a of the support bar 12 to have a nearly U-shaped cross section continuously, thus making it possible to secure the strength of the body part 12a of the support bar 12. Moreover, since the body part 12a of the support bar 12 has a nearly U-shaped cross section (apart of which is open) continuously, the following effects can be expected. That is, when the body part 12a of the support bar 12 is plated where the body part 12a is composed of a hollow pipe, there is a risk that plating liquid or the like enters an internal space of the hollow pipe to allow rust to be generated in the internal space.

In this respect, the stabilizer link 11 according to the second aspect (2) of the present invention allows a nearly U-shaped internal space in the body part 12a of the support bar 12 to be partly open. Therefore, even if any liquid enters the nearly U-shaped internal space, the liquid is discharged through the open part, allowing no rust to be generated in the internal space.

Moreover, the stabilizer link 11 according to a third aspect (3) of the present invention is the stabilizer link 11 according to the second aspect (2), wherein the nearly U-shaped and curved outer wall part 12a2 in the body part 12a of the support bar 12 is provided to follow the circular arc of a circumscribed circle of the body part 12a.

The stabilizer link 11 according to the third aspect (3) of the present invention allows the nearly U-shaped and curved outer wall part 12a2 in the body part 12a of the support bar 12 to be provided to follow the circular arc of the circumscribed circle of the body part 12a, thus making it possible, even if movement rotating around the axis of the body part 12a is caused in the support bar 12, to prevent mutual interference between the body part 12a and the members existing around the support bar 12.

Moreover, the stabilizer link 11 according to a fourth aspect (4) of the present invention is the stabilizer link 11 according to the first aspect (1), wherein the reinforcement parts 12b of the support bar 12 each have a nearly L-shaped cross section continuously.

The stabilizer link 11 according to the fourth aspect (4) of the present invention allows each reinforcement part 12b of the support bar 12 to have a nearly L-shaped cross section continuously, thus making it possible to secure the strength of each reinforcement part 12b in the support bar 12.

Moreover, the method for manufacturing the stabilizer link 11 according to a fifth aspect (5) of the present invention is a method for manufacturing the stabilizer link 11 according to any one of the first to fourth aspects (1) to (4), the method including forming the support bar 12, the forming the support bar 12 including: a step of carrying out press-forming to the workpiece 31 having a greater size by the folding margin BD (see FIG. 4C) than the external size of the support bar 12, to form the part that is to form the body part 12a and the reinforcement parts 12b; and after the step, a step of carrying out punching by which the holes 12b1 are punched in the parts that are to form the reinforcement parts 12b, the holes 12b1 each having the inner diameter Dc-in that allows passage of the ball part 21b of the ball stud 21.

In the method for manufacturing the stabilizer link 11 according to the fifth aspect (5) of the present invention, the support bar 12 is formed by carrying out press-forming to the workpiece 31 having a greater size by the folding margin BD than the external size of the support bar 12, to form the part that is to form the body part 12a and the reinforcement parts 12b, and then carrying out punching by which the holes 12b1 are punched in the parts that are to form the reinforcement parts 12b, the holes 12b1 each having the inner diameter Dc-in that allows passage of the ball part 21b of the ball stud 21.

The method for manufacturing the stabilizer link 11 according to the fifth aspect (5) of the present invention allows the support bar 12 to be formed by carrying out the press-forming and the hole punching, thus making it possible to obtain the stabilizer link 11 capable of realizing both securing of tensile breaking strength of the periphery of the ball part 21b and a reduction in the external size thereof, through a relatively simple process.

Other Embodiments

The embodiments described above show examples of materialization of the present invention. Accordingly, the technical scope of the present invention should not be restrictively interpreted by the embodiments. This is because the present invention can be put into effect in various forms without departing from the gist or essential features thereof.

Although the above embodiments of the present invention have been described, by way of example, taking the case in which the ball seat 25 made of resin is provided to be interposed between the ball part 21b of the ball stud 21 and the housing 23 made of resin, the present invention is not limited to this example. The ball seat 25 made of resin may be omitted as long as torque associated with slide of the ball part 21b on the housing 23 can be appropriately managed.

REFERENCE SIGNS LIST

- 11 Stabilizer link
- 12 Support bar
- 12a Body part
- 12b Reinforcement part
- 13 Ball joint
- 15 Suspension device (Structural member)
- 17 Stabilizer (Structural member)
- 21 Ball stud
- 21b Ball part
- 23 Housing

What is claimed is:

1. A stabilizer link provided in a vehicle provided with a suspension device and a stabilizer, and adapted to couple the suspension device and the stabilizer to each other,
    the stabilizer link comprising: a support bar made of metal; and ball joints each provided at both ends of the support bar, wherein
    the ball joints each include: a ball stud one end of which is fastened to a structural member, and which has a ball part at the other end thereof; and a housing made of resin that rotatably supports the ball part of the ball stud; and a ball seat provided to be interposed between the housing and the ball part and having a housing part for the ball part,
    the ball seat includes an encircling belt-shaped part for covering an equator part of the ball part, and
    the support bar includes: a body part extending in a nearly linear shape; and reinforcement parts each having a nearly annular shape and each provided at both ends of the body part, and wherein
    the reinforcement parts of the support bar each comprises: a base part having a longitudinal section that extends in a direction of an axis of rotation of the ball stud; and a folded part having a longitudinal section that extends in a direction orthogonal to the direction of the axis of rotation of the ball stud and inwardly toward the encircling belt-shaped part of the ball seat, and each reinforcement part composed of the base part and the folded part has a nearly L-shaped cross section continuously in a nearly annular manner,
    the base part and the folded part constituting the reinforcement part of the support bar are set to have a same thickness, and
    the reinforcement parts are each embedded in the housing so as to surround the encircling belt-shaped part of the ball seat.

2. The stabilizer link as set forth in claim 1, wherein the body part of the support bar has a nearly U-shaped cross section continuously in a nearly linear manner.

3. The stabilizer link as set forth in claim 2, wherein a nearly U-shaped and curved outer wall part in the body part is provided to follow a circular arc of a circumscribed circle of the body part.

4. A method for manufacturing a stabilizer link as set forth in claim 1, the method including forming the support bar, the forming the support bar comprising:
    a step of carrying out press-forming to a workpiece having a greater size by a folding margin than an external size of the support bar, to form a part that is to form the body part and the reinforcement parts; and
    after the step, a step of carrying out punching by which holes are punched in parts that are to form the reinforcement parts, the holes each having an inner diameter that allows passage of the ball part of the ball stud.

\* \* \* \* \*